(12) United States Patent
Hassert et al.

(10) Patent No.: US 11,292,485 B2
(45) Date of Patent: Apr. 5, 2022

(54) METHOD FOR GRANTING ACCESS AND DRIVING AUTHORISATIONS

(71) Applicant: DAIMLER AG, Stuttgart (DE)

(72) Inventors: Dirk Hassert, Wangen (DE); Thomas Hartmann, Altdorf (DE); Christian Rupert, Herrenberg (DE); Frank-Peter Pesl, Kandel (DE); Gerd Scheidhauer, Weingarten (DE); Christian Heikamp, Herxheim (DE)

(73) Assignee: DAIMLER AG, Stuttgart (DE)

( * ) Notice: Subject to any disclaimer, the term of this patent is extended or adjusted under 35 U.S.C. 154(b) by 257 days.

(21) Appl. No.: 16/641,473

(22) PCT Filed: Jun. 20, 2018

(86) PCT No.: PCT/EP2018/066368
§ 371 (c)(1),
(2) Date: Feb. 24, 2020

(87) PCT Pub. No.: WO2019/037922
PCT Pub. Date: Feb. 28, 2019

(65) Prior Publication Data
US 2021/0155256 A1 May 27, 2021

(30) Foreign Application Priority Data

Aug. 25, 2017 (DE) .................. DE10 2017 008 084

(51) Int. Cl.
*B60W 50/12* (2012.01)
*B60W 40/08* (2012.01)
(Continued)

(52) U.S. Cl.
CPC ............ *B60W 50/12* (2013.01); *B60W 40/08* (2013.01); *B60W 50/10* (2013.01); *G07C 5/008* (2013.01);
(Continued)

(58) Field of Classification Search
CPC ...... B60W 50/12; B60W 40/08; B60W 50/10; H04L 9/08; G07C 5/008
(Continued)

(56) References Cited

U.S. PATENT DOCUMENTS 9,494,938 B1 11/2016 Kemler et al.
9,779,564 B2 10/2017 Nagel et al.
(Continued)

FOREIGN PATENT DOCUMENTS

CN 101448340 A 6/2009
CN 102582574 A 7/2012
(Continued)

OTHER PUBLICATIONS

Office Action dated Apr. 25, 2021 in related/corresponding CN Application No. 201880047899.9.
(Continued)

*Primary Examiner* — Isaac G Smith
(74) *Attorney, Agent, or Firm* — Patent Portfolio Builders PLLC

(57) ABSTRACT

A method for granting access and driving authorizations and driving commands to be carried out, in the form of a data format, for a vehicle. A plurality of data processing systems of different user groups, which exchange the data format via a plurality of communication connections, are used, and an exchange undertakes the distribution of the data format among the respective involved user groups and into the vehicle.

6 Claims, 1 Drawing Sheet

(51) Int. Cl.
  *B60W 50/10*  (2012.01)
  *G07C 5/00*  (2006.01)
  *G07C 9/27*  (2020.01)

(52) U.S. Cl.
  CPC ....... *G07C 9/27* (2020.01); *B60W 2040/0809* (2013.01)

(58) Field of Classification Search
  USPC .............................................. 701/1; 340/5.72
  See application file for complete search history.

(56) References Cited

U.S. PATENT DOCUMENTS

| | | | |
|---|---|---|---|
| 10,055,694 B2 | 8/2018 | Ichinose et al. | |
| 10,279,840 B2 | 5/2019 | Nordbruch | |
| 10,656,648 B2 | 5/2020 | Suzuki et al. | |
| 2014/0303837 A1 | 10/2014 | Tuukkanen | |
| 2015/0137943 A1* | 5/2015 | Nagel | G07C 5/008 340/5.72 |
| 2015/0285645 A1* | 10/2015 | Maise | H04W 4/029 701/25 |
| 2015/0321641 A1 | 11/2015 | Mahmoud et al. | |
| 2015/0337587 A1 | 11/2015 | Lu et al. | |
| 2015/0339928 A1 | 11/2015 | Ramanujam | |
| 2016/0189098 A1* | 6/2016 | Beaurepaire | H04W 12/084 705/337 |
| 2016/0301698 A1 | 10/2016 | Katara et al. | |
| 2017/0236343 A1* | 8/2017 | Leboeuf | H04L 9/0825 340/5.61 |

FOREIGN PATENT DOCUMENTS

| | | |
|---|---|---|
| CN | 104395937 A | 3/2015 |
| CN | 107074281 A | 8/2017 |
| DE | 102012012389 A1 | 1/2013 |
| DE | 102013201168 A1 | 7/2014 |
| DE | 102014001836 A1 | 8/2014 |
| DE | 102014221749 A1 | 4/2016 |
| JP | 2007280110 A | 10/2007 |
| JP | 4887877 B2 | 2/2012 |
| JP | 2016006603 A | 1/2016 |
| JP | 2016186813 A | 10/2016 |
| JP | 2017091557 A | 5/2017 |
| WO | 2014024254 A1 | 2/2014 |
| WO | 2017136725 A1 | 8/2017 |

OTHER PUBLICATIONS

Office Action dated Mar. 2, 2021 in related/corresponding JP Application No. 2019-572537.
Office Action dated Oct. 5, 2021 in related/corresponding JP Application No. 2019-572537.
Examination Report created on Apr. 16, 2018 in related/corresponding DE Application No. 10 2017 008 084.4.
International Search Report dated Dec. 6, 2018 in related/corresponding International Application No. PCT/EP2018/066368.
Written Opinion dated Dec. 6, 2018 in related/corresponding International Application No. PCT/EP2018/066368.

* cited by examiner

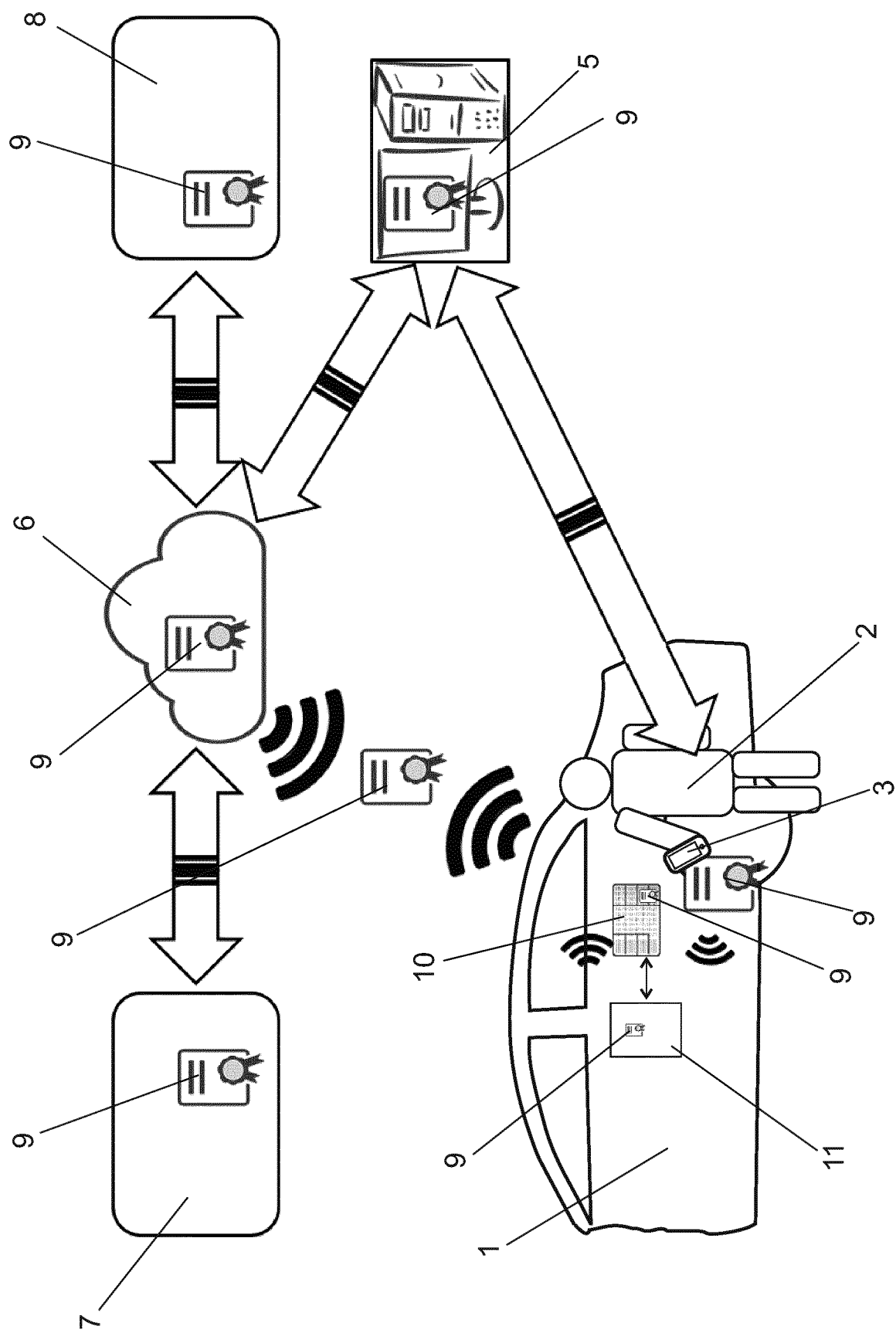

METHOD FOR GRANTING ACCESS AND DRIVING AUTHORISATIONS

BACKGROUND AND SUMMARY OF THE INVENTION

Exemplary embodiments of the invention relate to a method for granting access and driving permissions.

The invention is intended to make the use of vehicles more flexible. For this purpose, the method according to the invention makes it possible and implements in particular the checking and granting of permissions to access the vehicle, the granting of driving permissions for the vehicle, as well as the giving of driving commands to the vehicle. In this respect, the method can be used particularly advantageously in vehicles that can drive semi-autonomously or completely autonomously. In this case, manual operation of the vehicle and autonomous or semi-autonomous operation of the vehicle can then be combined.

Giving driving commands to autonomously mobile vehicles is known, for example, from DE 10 2014 001 836 A1, which discloses transmitting authentication codes and further communication contents via a signal to be exchanged between the vehicle and an infrastructure unit. According to paragraph 18 of this document, further communication contents include, in particular, a driving order the driver inputs into the vehicle so that the vehicle carries out a subsequent parking maneuver including autonomously or semi-autonomously entering a parking garage with the assistance of a data center. Permissions to access the vehicle and driving permissions for the vehicle are not granted by the aforementioned method.

Furthermore, DE 10 2012 012 389 A1 discloses a method for distributing permissions to access the vehicle and driving permissions for the vehicle. Here, both the access permissions and the driving permissions are transmitted from a database server in the vehicle backend of the vehicle manufacturer to a mobile terminal in the hands of the potential vehicle user. The mobile terminal in this case has a protected memory region into which the data are transferred. The disposal over the protected memory region can be assigned to different user groups, so that a mobile driving permission and access permission system can be realized that takes account of different vehicle users. The giving of driving commands and thus the meaningful involvement of autonomous or semi-autonomous vehicles is not possible with the aforementioned method, since the potential driver must always open, start and drive the vehicle.

DE 10 2013 201 168 A1 discloses a remote control system for motor vehicles, in which the driver can switch between manual operation of the vehicle and autonomous or semi-autonomous operation of the vehicle. In the autonomous or semi-autonomous operation, the driver relinquishes control to a remote monitoring means or to a driving agent who then controls the vehicle. The vehicle user can determine which persons should be involved in the remote monitoring. Conversely, the remote monitoring means can take control of the vehicle if the driver is clearly no longer fit to drive the vehicle safely. A central system similar to a vehicle backend facilitates the data connection between a personal data terminal of the vehicle user and the remote monitoring system. In addition, the central system makes offers for carrying out the remote monitoring to various operators. The required software programs are provided by the central system. Likewise, the central system provides the communication link between the agreed operator, the vehicle and the personal data terminal of the vehicle user. For these remote monitoring systems, a permanent and interference-free communication link between the vehicle, the data terminal of the vehicle user and the agreed operator is essential for the remote monitoring, as set forth in paragraph 26 of this document.

U.S. Pat. No. 9,494,938 B1 discloses a method for operating an autonomous vehicle, a robo-taxi, which is guided to a customer requesting the vehicle. When the autonomous vehicle reaches the customer, information is displayed to the customer, either on the vehicle or in a mobile data terminal of the customer, which identifies the vehicle to the customer as the ordered taxi. For this purpose, a unique data signal, a so-called token, is exchanged and distributed between different data processing systems belonging to the taxi operator, customers and the vehicle. This token contains the data required to uniquely assign the ordered taxi to the requesting customer and to identify the taxi when it arrives at the customer. The signal is likewise used to allow the robo-taxi to authenticate the customer for the particular driving order. This method requires no change over the control of the vehicle. The vehicle remains in the autonomous driving operation even if the customer has boarded. A master computer in the vehicle retains full control over the vehicle at all times and guides the vehicle to the detected position of the customer's mobile terminal by means of a position-adjustment of the vehicle. The driving permission therefore does not have to be checked. Nor does the customer need to be granted a permission to access the vehicle. The token can be granted only by a dispatching system at the taxi operator. There is therefore no independent certificate authorization by the person entitled to dispose of the vehicle. The creation of the token is always tied to the dispatching system of the taxi operator. The method is thus limited to this application. The dispatching system establishes communication interfaces to the vehicle and to the customer. Other communication links with additional central data processing systems such as the vehicle backend of the vehicle manufacturer, car rental companies or central background systems of a manufacturer, by means of which the driving permission systems and access permission systems of the vehicle are provided with data, do not exist. The method from U.S. Pat. No. 9,494,938 B1 is therefore limited to the operation of robo-taxis without a change in the control over the vehicle.

In summary, none of the aforementioned technical teachings is able to deal with the issues of access permission, driving permission and issuing driving commands for the autonomous driving operation in a single method. For example, none of the aforementioned methods can involve a vehicle driving to a potential user in the autonomous driving operation, followed by the user driving the vehicle further in the manual driving operation. This already founders on account of the driving permission systems, which have hitherto always required a handover of an identification element assigned to the vehicle owner in the form of a key or a Keyless Go card. That is to say, although the vehicle can be moved autonomously if the identification element is in the vehicle, this means that anyone can take over the vehicle. There would no longer be any theft protection at all. The vehicle owner would no longer have control over the vehicle. If the identification element is located with the current vehicle owner, only this person can start the vehicle. Autonomous driving without the current owner of the identification element being present is not possible because the immobilizers immediately intervene when no identification element is detected in the vehicle.

Another unresolved problem from the previously mentioned method is the question of control regarding the driving commands in the autonomous driving operation and the question of the permission of access into the vehicle in the autonomous driving operation or when switching to the manual driving operation. The execution of driving commands and the access permission have thus far also been linked to the physical presence of an identification element. A service provider such as a car rental company cannot have the vehicle driven autonomously, without a driver, to the customer in the theft-proof state, followed by the customer taking over the vehicle and driving further. The driver would not be able to use the previous access permissions to enter the vehicle since the driver would first have to be given a physical identification element.

The problem addressed by the invention is therefore that of providing a method by means of which the switch between the driverless autonomous driving operation and the manual driving operation can be better combined without leading to problems with driving permission systems, access permissions or the issuing of driving commands.

The solution is achieved by means of a method in which a plurality of data processing systems of different user groups (e.g., car rental company, central background system of the manufacturer of the vehicle, user authentication means, vehicle backend, potential vehicle user) exchange a data format, which may also be referred to as a certificate, via communication links, and an exchange (e.g., the vehicle back end) distributes the data format among the user groups involved in each case and into the relevant vehicle. The data format in this case contains data for the access permission, for the driving permission and for the travel command to be executed in the autonomous driving operation.

A major advantage of the method is that no physical identifier is necessary for the implementation, but the existing physical identifier for the vehicle, such as the vehicle key or Keyless Go card, can be used in parallel for this purpose, without the access permission codes and driving permission codes from the keyless method blocking or interfering with the codes in the physical identifier. This is also achieved by custom driving permissions and access permissions being generated and distributed by means of the data format in the method. This means that method-specific hash codes are generated and used, which leaves the use of hash codes in the physical identifier untouched. The vehicle recognizes whether it is to be made accessible and started via a transmitted data format or by means of physical identifier which transfers a certificate. Accordingly, either the permission data from the data format or the permission data from the physical identifier are checked on the vehicle side and are used after a successful check.

According to a very favorable embodiment, it is expedient that the data processing system of the potential vehicle user is a mobile communication device.

According to a further advantageous embodiment of the method according to the invention, the data processing systems exchange the data format with one another and fill it with the required data. If necessary, the data format must be filled with other required data. The data processing systems of the user groups involved in each case exchange the data format with one another and fill it, such that ultimately the completely filled data format is present accordingly at least in the region of the exchange, for example the vehicle back end, and can be transferred as a completely filled data format to the vehicle. This procedure makes it possible for the individual data processing systems to initiate the generation of data formats, even if they do not have all the required data. These can then be supplemented in another way, for example by a person entitled to dispose of the vehicle giving the OK for the vehicle to be used, for example, by another user, or the like. The filled-in data format then reaches the vehicle and can be used here accordingly.

According to a very advantageous development of the method, the data format transmitted to the vehicle can be stored in the vehicle, in particular in a protected memory region.

Another major advantage of the method thus developed according to the invention is the increased availability of the vehicle and in particular the increased operational reliability in the autonomous driving operation. In contrast with the previously known monitoring methods or remote control methods, there is no need for a permanent online connection, which must not be terminated, in the autonomous driving operation. This is achieved by placing the data format or certificate in the vehicle. An online connection is only necessary for the duration of the transmission. After successful transfer, the vehicle has all the necessary data to implement an access permission, driving permission and driving order. The driving order may optionally be carried out using an additional assistance system, for example a navigation system. Nor does the user need a permanent or temporally coordinated data connection to one of the participating data processing systems. The distribution of the data format to the participating data processing systems can take place independently of one another on the separate communication paths. In principle, there is therefore no need for a permanent online connection in the autonomous driving operation in order to carry out the autonomous driving.

According to a favorable development of this embodiment of the method according to the invention, the data format transmitted to the vehicle and stored in the vehicle comprises data for a plurality of successively usable access and driving permissions as well as driving commands to be executed. The exchange, such as the vehicle back end, can thus transfer not only one data format to the vehicle, but a plurality thereof which can be used successively. This makes it possible to transmit a group of data formats to the vehicle, for example ten individual data formats. Using each of these data formats, an access permission or a driving permission can then be issued, and a driving command to be executed can be authorized, without there being an online connection of the vehicle to the exchange. Even if the vehicle does not have an online connection to the exchange for a long period of time, it can nevertheless be used by means of the preferably mobile terminal as the data processing system of the potential vehicle user in order for the user to be identified, preferably multiple times in succession, such that a journey can for example be interrupted and can be continued after a certain waiting period, an overnight stay or the like, without an online connection between the vehicle and the exchange being required therebetween. With respect to the use, this is a decisive gain in terms of comfort if no continuous online connection between the vehicle and the exchange is possible.

Further advantageous embodiments and developments can be found in the additional dependent subclaims and in the exemplary embodiments, which are explained in more detail below with reference to the drawing.

BRIEF DESCRIPTION OF THE DRAWING FIGURE

The drawing shows the individual functions and tasks of the participating data processing systems in a schematic example.

DETAILED DESCRIPTION

The drawing shows a vehicle 1 and a potential vehicle user 2. The user 2 has a mobile terminal 3, for example a smartphone as a data processing system. The potential vehicle user 2 or the potential vehicle user's smartphone 3 is connected, for example, to a user authentication means 5 via a communication link which is indicated schematically. This is shown here by way of example as a desktop computer and can be positioned, for example, in an office or at the home of the person entitled to dispose of the vehicle 1. This data processing system for user authentication is in turn in contact with an exchange designated by 6, which is designed as a vehicle back end and is also referred to as DaiVB (Daimler vehicle back end). This exchange 6 in turn is in contact with a data processing system of one or more service providers for vehicle-related services 7. This may be for example a car-sharing system, a car rental company or the like. In addition, the exchange 6 is connected to a background server, designated by 8, of the vehicle manufacturer. These connections can be established, for example, via Internet connections, preferably secure Internet connections.

The user authentication means 5 is operated and executed by the person entitled to dispose of the vehicle 1 in question. For example, the entitled person authorizes, for example, a requesting data format 9 and documents his/her approval in the data format 9. Expediently, the authentication is carried out via the Mercedes-me service, another Internet portal associated with the vehicle and/or a parallel app.

The DaiVB 6 receives the authorized data format 9 and further distributes the data format and any other potentially required requests to fill the data format 9 with more data. The most important task of the DaiVB 6 is then the transfer of the fully filled data format 9 to the relevant vehicle 1 or to a secure element 10 (protected data region) in the vehicle 1.

The central background system 8 in particular provides access data and driving permission data and fills the data format 9 with the access data and driving permission data specific to the vehicle 1. The driving permission data (hash codes for the driving permission system) can in this case be routed from the DaiVB 6 into the vehicle 1, so that the vehicle 1 can be started and moved using these codes. The routing from the DaiVB 6 into the vehicle 1 is indicated accordingly via an air interface.

The access permissions are also routed from the DaiVB 6 to the mobile terminal 3 of the user 2, either directly via mobile communication or indirectly via the user authentication 5, as indicated here. The user 2 can then open the vehicle 1, which is sent to the user, for example, by autonomous driving, using his/her mobile terminal 3.

The hash codes for the driving permission have already been transferred to the vehicle 1 before the time of use. In the vehicle 1, a control unit 11 or a control unit network verifies whether the data format 9 transmitted by the DaiVB 6 to the vehicle 1 contains the same identifier as the data format 9 on the mobile terminal 3 of the user 2. If so, the driving permissions transmitted to the vehicle 1 are authorized and the vehicle 1 can be started and driven by the user 2 via the start button. Expediently, a sufficient number of driving permissions (hash codes) are transmitted for it to be possible to start the vehicle 1 multiple times, until all hash codes have been used up. Alternatively, the transferred access and driving permissions can also be restricted in terms of time or location, e.g., based on the position of the vehicle 1.

The service provider 7 (e.g., lessor, car sharing company, such as Car2Go, etc., or private citizen) offers the vehicle 1 that the service provider is entitled to dispose of, for example, on the Internet. In this case, the service provider 7 may coincide with the user authentication means 5 in the drawing. If an offered vehicle 1 is requested by the user 2, the filling of the data format can also be started by the service provider 7. The service provider 7 can then issue the authorization itself. The exchange 6 again distributes the filled data format 9 to the vehicle 1 and to the user 2. Access and driving permission data are also written into the data format 9 by the central background system 8 in this case. If the vehicle 1 is intended to drive autonomously to the user 2, a driving order for the autonomous driving must be created and written into the data format 9. If autonomous driving is intended to be carried out, the vehicle 1 carries out this journey with the information in the driving order. In this case, the vehicle 1 can start itself using the driving permissions likewise transferred via the data format 9 as soon as there is a certificate authorization from the user authentication 5 means, which is likewise contained in the data format 9 and can be verified by the control unit 11 in the vehicle 1.

Another application arises when the vehicle manufacturer itself wishes to have the vehicle 1 drive autonomously, e.g., at the end of the production process or for loading or shipping the vehicle 1. The vehicle manufacturer then starts the process using its central background system 8, and a data format 9 is created by this background system 8. In this case, the authentication is performed by the vehicle manufacturer, and therefore the background system 8 and the user authentication 5 coincide, with the elimination of the service provider 7. The DaiVB 6 also routes the data format 9 to the other participating data processing systems. The driving order must then be created by the vehicle manufacturer via the central background system 8. The further course of the process continues as previously described for autonomous driving.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURE enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:
    receiving, by a vehicle from at least one data processing system, a certificate, wherein the certificate includes data for access permission for accessing the vehicle, data for driving permission for starting the vehicle, and a driving command to be executed in an autonomous driving operation of the vehicle;
    autonomously driving the vehicle to a user based on the driving command in the certificate;

receiving, by a mobile terminal of the user from the at least one data processing system, the certificate;

providing, by the mobile terminal to the vehicle, the certificate;

verifying, by the vehicle, whether the certificate received from the at least one data processing system has a same identifier as the certificate provided by the mobile terminal; and providing, by the vehicle, the user access to the vehicle responsive to the verification that the certificate received from the at least one data processing system has the same identifier as the certificate provided by the mobile terminal; and allowing, by the vehicle, the user to start the vehicle responsive to the verification that the certificate received from the at least one data processing system has the same identifier as the certificate provided by the mobile terminal.

2. The method of claim 1, further comprising:

storing, by the vehicle, the received certificate in a protected memory region of the vehicle.

3. The method of claim 1, wherein the data for driving permission is a hash code.

4. The method of claim 1, wherein the data for driving permission includes a plurality of hash codes.

5. The method of claim 1, wherein the certificate includes a plurality of access and driving permissions, wherein the plurality of access and driving permissions are useable successively.

6. The method of claim 1, wherein the vehicle receives a plurality of certificates, and wherein the certificate is one of the plurality of certificates.

* * * * *